United States Patent [19]

Swanson

[11] 3,994,200
[45] Nov. 30, 1976

[54] FASTENER-WASHER COMBINATION

[76] Inventor: Roger I. Swanson, 114 Glenwood Way, Butler, Pa. 16001

[22] Filed: Jan. 15, 1973

[21] Appl. No.: 323,503

[52] U.S. Cl. .................................. 85/45; 85/1 JP; 85/28; 85/50 R
[51] Int. Cl.[2] ..................... F16B 29/00; F16B 43/00
[58] Field of Search ............... 85/1 JP, 50 R, 28, 45, 85/37; 151/14 DW

[56] References Cited
UNITED STATES PATENTS

| | | | |
|---|---|---|---|
| 1,298,015 | 3/1919 | Curtis | 85/28 |
| 1,995,705 | 3/1935 | Deniston | 85/28 |
| 1,995,706 | 3/1935 | Deniston | 85/28 |
| 2,326,455 | 8/1943 | Gray | 85/28 |
| 2,439,516 | 4/1948 | Holcomb | 85/50 R |
| 2,760,400 | 8/1956 | Mills et al. | 85/1 JP |
| 2,771,262 | 11/1956 | Laystrom | 85/1 JP |
| 3,221,588 | 12/1965 | Wieber | 85/47 |
| 3,247,752 | 4/1966 | Greenleaf et al. | 85/1 JP |
| 3,396,765 | 8/1968 | Ridenour | 85/45 |
| 3,469,490 | 9/1969 | Pearce | 85/37 |
| 3,630,116 | 12/1971 | Harper | 85/37 |

FOREIGN PATENTS OR APPLICATIONS

| | | | |
|---|---|---|---|
| 26,634 | 3/1931 | Australia | 85/28 |
| 283,099 | 10/1965 | Australia | 85/28 |
| 73,313 | 9/1916 | Switzerland | 85/50 R |
| 335,071 | 9/1930 | United Kingdom | 85/28 |
| 659,486 | 10/1951 | United Kingdom | 85/1 JP |

Primary Examiner—Roy D. Frazier
Assistant Examiner—Thomas J. Holko
Attorney, Agent, or Firm—Webb, Burden, Robinson & Webb

[57] ABSTRACT

A fastener-washer combination for securing a thin workpiece to a support member includes a fastener having a head and shank portion connected through a bugle shaped intermediate section which smoothly blends into the shank. A resilient washer frictionally engages the shaft and is adapted to interact with the bugle shaped section as the fastener is driven into the workpiece.

10 Claims, 5 Drawing Figures

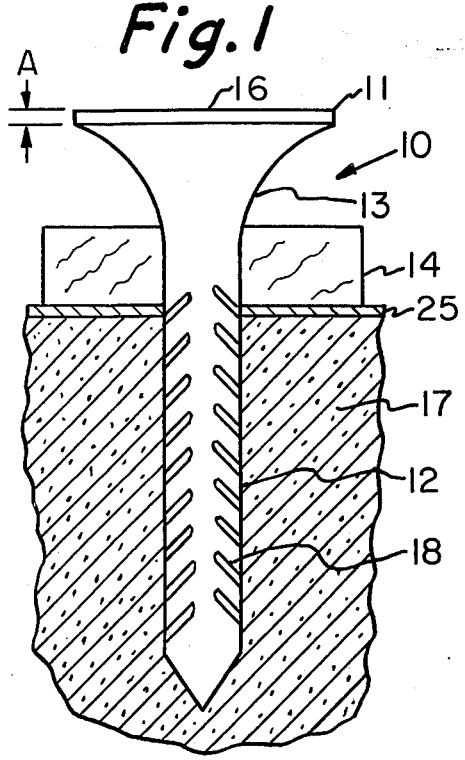
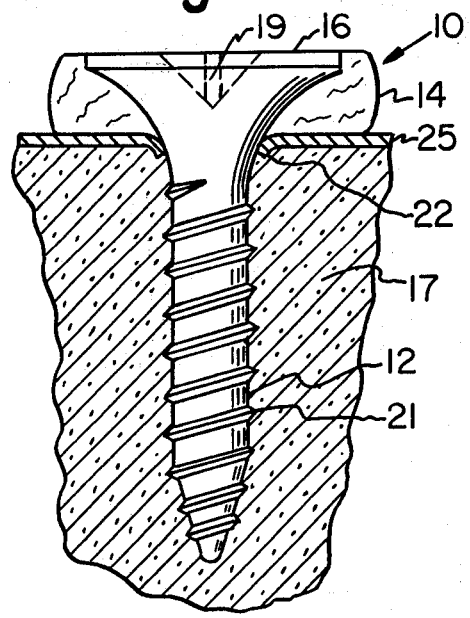
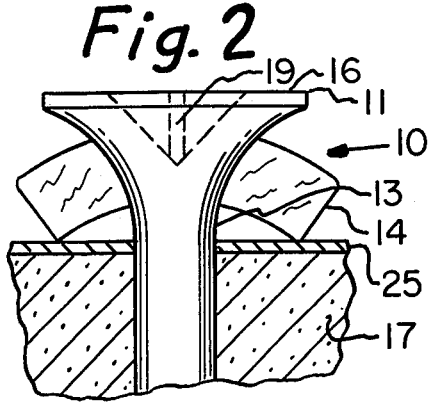
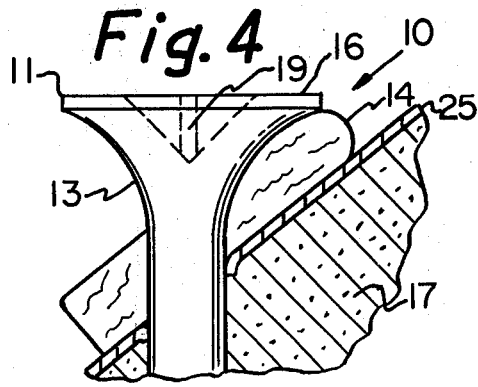
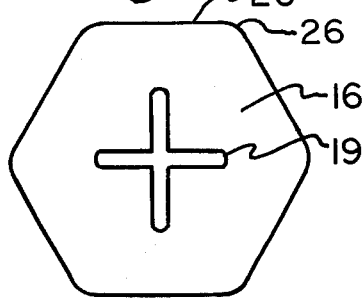

FASTENER-WASHER COMBINATION

BACKGROUND OF THE INVENTION

My invention relates to a fastener-washer combination and, more particularly, to a fastener-washer combination which is adapted to secure a thin workpiece to a support member.

There has been a major change in the last 25 years from a wood on wood exterior building construction to a metal sheet on wood or a metal sheet on steel construction. Wood has the ability to seal a fastener; however, metal sheeting requires a resilient seal under the head of the fastener to provide a proper seal. Neoprene washers and O-rings now used provide highly elastic compression seals but do not provide a good tensile or a good slip resistant joint. In the case of nail fasteners driven into wet wood, the nail will often pop out as much as 0.05 inch when the wood dries causing the joint to leak. In the case of screw fasteners, automatic driving tools tend to over or under drive the fastener especially when used on a high productivity basis. Both an over drive or under drive condition can also create leaks with the standard fastenerwasher combination.

Fasteners, per se, having the head connected to the shank through a conical or curved surface are already known in the art, e.g. U.S. Pat. No. 3,221,588, but these fasteners are utilized without resilient washers for different applications and function differently in their particular environment. In addition, fasteners with integrally connected washers are known, e.g. U.S. Pat. No. 3,247,752, but such fasteners do not interact with the washer portion in the manner of applicant's invention.

SUMMARY

My fastener-washer combination provides a tight mechanical securement of the thin workpiece to the support member and provides an improved seal in the area of that securement. This is true even where popping out occurs in the case of a nail or an under driven condition occurs in the case of a screw. In addition, the interaction of the fastener and washer eliminates any possible over driven condition. My fastener-washer combination also provides an adequate seal when the fastener is driven at an angle. The fastener roll forms the thin workpiece into the support member to increase the mechanical securement and the seal and to increase the resistance to shear. A preferred embodiment of the fastener head construction permits an assured direct alignment of the fastener and automatic quick release from a power driving tool. As a result of the improved mechanical gripping power and sealing ability of my fastener-washer combination, fasteners can be utilized in small sizes to replace standard fasteners of substantially greater size used in combination with washers.

My fastener-washer combination accomplishes these improved results through the interaction of a bugle shaped intermediate section between the head portion and the shank and the resilient washer. The washer is frictionally engaged on the shank of the fastener and interacts with the bugle shaped section as the fastener is driven into a thin workpiece and a support member.

BRIEF DESCRIPTION OF THE DRAWINGS

FIG. 1 is a section of my fastener-washer combination in a partially driven condition wherein the fastener is in the form of a nail;

FIG. 2 is a section of my fastener-washer combination in a partially driven condition or a backed out or popped out condition;

FIG. 3 is my fastener-washer combination in a fully driven position and in which the fastener is a screw;

FIG. 4 is my fastener-washer combination showing the fastener driven at an angle to the workpiece and support member; and FIG. 5 is a plan view of a particular fastener head which can be employed in my fastener-washer combination.

DESCRIPTION OF THE PREFERRED EMBODIMENT

My fastener-washer combination, generally designated 10, consists of a fastener 11 and a resilient washer 14, FIGS. 1–4. The fastener 11 includes a fastener head 16 and a shaft 12 which are connected through a curved intermediate section 13. Intermediate section 13 blends into shaft 12 so as to avoid a definite intersection. Section 13 is curved on a radius in the form of an involute but is easier defined as being in the shape of the head of a bugle, and the intermediate section 13 is hereafter referred to as bugle shaped.

The shaft 12 of the fastener 11 may be in the form of a nail, FIG. 1, a screw, FIG. 3, a rivet, a pin, or any other suitable fastener which is employed to secure a thin workpiece to a support member. The nail illustrated in FIG. 1 includes a plurality of standard gripping grooves 18 and the shank 12 of the screw illustrated in FIG. 3 includes a plurality of standard threads 21.

The fastener head 16 may also be of a variety of shapes and configurations. A preferred form of fastener head 16 is illustrated in FIGS. 2–5. The fastener head 16 has a perimeter defined by flat faces 20 in the form of a hexagon, the flat faces 20 being joined through short arcuate surfaces 26, FIG. 5. The head 16 is also deeply recessed in the form of a cross 19 to accommodate a driving tool. The combination of the recessed cross 19 and the hexagonal perimeter 20 permits direct alignment of the fastener, thereby being amenable to power driven driving tools. The washer head 16 is relatively thin or of slight axial extent as illustrated at A in FIG. 1. The thin head 16 can be driven in flush engagement with the resilient washer 14, FIG. 3. The hexagonal faces 20 place the stress on the periphery of the head 16 to prevent over driving as explained in more detail hereinafter.

The washer 14 is normally a flat washer made of a resilient material such as vinyl. Other resilient materials such as neoprene can be used but because of the interaction between the washer 14 and the bugle section 13, lower cost resilient materials can be employed and will still result in improved properties over the more expensive materials used in combination with the presently employed fasteners.

My fastener-washer combination 10 has a particular application in the joining of a thin workpiece 25 to a support member 17. This thin workpiece is normally a metal such as steel or aluminum and the support member 17 is normally wood or a steel structural member.

The washer 14 frictionally engages the shaft 12 of the fastener 11 and is normally positioned just below the bugle section 13. As the fastener 11 is driven into the thin workpiece 25 and support member 17, the washer 14 slides upward to interact with the bugle section 13, FIG. 1. As the fastener 11 is driven further, the flat washer 14 actually bows upward in the area of the bugle section 13 and this is illustrated in exaggerated form in FIG. 2. As the fastener 11 continues to be driven into the finished position illustrated in FIG. 3, several things occur. The bugle section 13 extends beyond the bottom surface of the washer 14 and roll forms the thin workpiece 25 so that the resultant roll form portion 22 of the thin workpiece 25 penetrates into the support member 17. The result of this is that the bugle shaped section 13 supports the fastener 11 against the workpiece 25. This differs from screw or nail having a flat undersided head and in which the washer is squeezed between the head and the thin workpiece. The bugle shaped section 13 also squeezes down on the washer material 14 to cause the washer to sealably engage the workpiece 25 along the washer bottom surface and the bugle section configuration tightly forces the resilient material of washer 14 in the area around the hole formed in the workpiece 25 and support member 17 by the fastener 11.

The fastener 11 is driven until the head 16 of the fastener 11 is flush with the upper surface of the washer 14. Where an automatic driving tool is employed having a socket head to cooperate with the hexagonal faces 20 of a fastener head 16, the driving tool will automatically disengage itself when the head 16 is flush with the washer 14 since there will no longer be a contact between the socket type tool of the driver and the fastener head. Because of the interaction of the bugle shaped section 13 and the resilient washer 14, the fastener 11 can also be driven at an angle to the workpiece 25 and a support member 17, FIG. 4, and still acquire the proper securement and seal.

Specifically, as the washer 14 slides up the bugle shaped section 13, the top inside surface of the washer 14 expands, thereby causing the outer lower lip to turn down, FIG. 2. This produces a sealing cup having a height greater than the original washer thickness. Therefore, if the head 16 of the fastener pops up, the washer 14 will be forced down the bugle shaped section 13, thereby retaining the seal, FIG. 2. In addition, as the washer 14 slides up the bugle shaped section 13, the washer is placed in tension. Therefore, a material such as vinyl which has relatively low compressibility but a high tensile memory, will return to the original unstretched size, retaining the seal.

A series of tests have been conducted which illustrate the effect of the interaction of the bugle shaped intermediate section and a resilient washer as compared to standard fastener-washer combinations. The results of these tests which are both mechanical strength tests and sealing tests are illustrated in Tables 1 and 2 respectively and explanations of these tests appear hereinafter. All reported results are the average value from several tests.

TABLE 1

| MECHANICAL STRENGTH TESTS OF FASTENER-WASHER COMBINATIONS | | |
|---|---|---|
| | Subject Invention No. 6 × 1 screw 5/16 dia. head | Prior Art - 9 Ga. 1-3/4 " ring shank nail 1/2 dia. head |
| Test 1 Push through resistance | 462 lb. | 438 lb. |
| Test 2 Pull out resistance | 5/8" engaged 343 lb. | 1-1/4" engaged 179 lb. |
| Test 3 | | |

TABLE 1-continued

| MECHANICAL STRENGTH TESTS OF FASTENER-WASHER COMBINATIONS | | |
|---|---|---|
| | Subject Invention No. 6 × 1 screw 5/16 dia. head | Prior Art - 9 Ga. 1-3/4 " ring shank nail 1/2 dia. head |
| Peel resistance | 350 lb. | 307 lb. |

TABLE 2

| SEAL TESTS OF FASTENER-WASHER COMBINATIONS | | |
|---|---|---|
| | Subject Invention Vinyl Seal | Prior Art Ring shank nail Neoprene seal |
| Test 1 Metal to Wood 3" Water Head | *H = .150" no leak | *H = flush leak |
| Test 2 Metal to Insulation 3" Water Head | *H = .150" no leak | *H = flush leak |
| Test 3 Sealing Pressure 1" Water Head 6" Water Head | 1 oz. 1 oz. | 32 oz. 128 oz. |

*H = height of nail head above the uncompressed seal thickness.

Test 1 in Table 1 covers tests conducted on a 29 gauge high tensile steel sheet supported at its ends to determine the push through resistance of the subject invention and the prior art fastener-washer combination. The respective samples were driven into the sheet between the rigid end supports and were pushed entirely through the sheet. The results of Test 1 show that the head of the subject invention offers more resistance to push through although it is only 5/16 inch diameter as compared to ½ inch diameter head on a prior art fastener. This is due to the rolled edge of the metal sheet caused by the bugle section. The rolled edge is stronger in an analogous manner to a ribbed sheet being stronger. The standard ring shank nail had a standard flat bottom configuration for the head.

Test 2 reported in Table 1 merely illustrates the amount of force necessary to pull out the No. 6 screw having ⅝ inch engaged in a large fir block as compared to a 9 gauge 1¾ inch ring shank nail having 1¼ inch engaged in the fir block. The results of Test 2, when compared to Test 1, show that the fastener of the subject invention will pull out of wood before it would pull through the thin metal sheet. This is also true for the standard ring shank nail tested.

Test 3 of Table 1 is a peel test which assimilates the effects of a wind storm or the like where the metal sheet is being ripped off of a support member and the metal sheet is actually torn in the area of the fastener to disengage from the fastener. Test 3 was conducted by peeling a 29 gauge high tensile steel sheet off of a fastener-washer of the subject invention and a prior art fastener-washer. The results indicate that even though a smaller diameter head was employed for the subject invention, greater force was required to peel the metal sheet from the fastener. This improvement is the result of the bugle head extending through the resilient washer and actually engaging the metal sheet to increase the support and shear resistance.

The leak tests set forth in Table 2 compare a fastener of the subject invention in combination with a vinyl washer with a standard ring shank nail in combination with a neoprene washer. Fasteners employed were of such a size that the ultimate diameter hole in the metal sheet was constant for all tests. In Test 1 a thin metal sheet was secured to a wood support and the fastener was then backed off until it started to leak. A cylindrical tube having a 3 inch head of water was placed over each fastener and the height at which the fastener head was removed from the metal at the time of leak was measured. The fastener of the subject invention showed signs of leaking when it had been backed out to a height of 0.150 inch and there was no leaking until that height. The standard ring shank nail with neoprene washer started to leak immediately after it had been backed out to the uncompressed seal free height.

The same type of leak test was conducted on a sheet metal to insulation connection and the same results were obtained as in Test 1. These results appear as Test 2 in Table 2.

The sealing pressure was tested by freely suspending a fastener-washer combination through a thin metal workpiece then securing weights to the free end of the fastener. The necessary amount of weight was determined to effect a seal when exposed to a tube of water having a 1 inch head and a 6 inch head respectively. It can be seen from the results of Test 3 that only one ounce of weight was necessary to effect a seal between the fastener-washer combination of the subject invention for both a 1 inch head and a 6 inch head of water. These results compare favorably with the 32 ounces and 128 ounces respectively required for the ring shank nail and neoprene washer.

The roll forming of the thin workpiece into the support member is so effective in aiding the seal, that fastener-washer combinations of the subject invention have been completely removed and the wood support is only wetted in the bore formed by the fastener below the roll formed metal. In addition, field tests have been performed on metal roofing where the fastener-washer combination of the subject invention have performed without leakage and standard fastener-washer combinations used heretofore have resulted in some leakage under normal conditions of use.

I claim:

1. A fastener-washer system for securing a thin metal sheet to a support member, said system comprising a fastener having a head portion and shank portion connected through a bugle shaped intermediate section which smoothly blends into the shank portion and a resilient washer independent of and frictionally engaged about the shaft, said washer adapted to interact with the bugle section as the bugle section rolls the thin metal sheet into engagement with the support member, said bugle section extending in part below the surface of the resilient member so as to engage the metal sheet.

2. The combination of claim 1 wherein the head portion includes a hexagonally shaped periphery of relatively thin axial extent.

3. The combination of claim 2 wherein the head portion is recessed in the form of a cross along an upper surface.

4. The combination of claim 1 wherein the fastener is a nail.

5. The combination of claim 1 wherein the fastener is a screw.

6. The combination of claim 1 wherein the fastener is a rivet.

7. A fastener construction comprising a thin workpiece, a support member and a fastener system securing the thin workpiece to the support member, said fastener system including a fastener having a head portion and a shank portion connected through a bugle shaped intermediate section which smoothly blends into the shank portion and a resilient washer independent of and frictionally engaging the fastener, the bugle portion extending through the washer so as to engage the thin workpiece and roll form the thin workpiece into engagement with the support member, said connection characterized by a tight mechanical securement of the workpiece to the support member and an improved seal in the area of the securement.

8. The construction of claim 7 wherein the fastener head penetrates into the resilient member so as to be substantially flush with a top surface thereof in a secured position.

9. The construction of claim 8 further characterized by an automatic disengagement of a driving tool when the fastener head becomes flush with the resilient member.

10. The construction of claim 7 further characterized by a cup-type sealing effect when the fastener is in a backed off or popped out condition.

* * * * *